United States Patent
Lucas et al.

(10) Patent No.: US 7,325,955 B2
(45) Date of Patent: Feb. 5, 2008

(54) APPARATUS AND METHOD FOR MOUNTING AND ADJUSTING LED HEADLAMPS

(75) Inventors: Kyle P. Lucas, Clawson, MI (US); Ronald L. Steen, Lindenhurst, IL (US)

(73) Assignee: Schefenacker Vision Systems Germany GmbH (DE)

( * ) Notice: Subject to any disclaimer, the term of this patent is extended or adjusted under 35 U.S.C. 154(b) by 144 days.

(21) Appl. No.: 10/568,824

(22) PCT Filed: Sep. 7, 2004

(86) PCT No.: PCT/US2004/028846
§ 371 (c)(1),
(2), (4) Date: Feb. 21, 2006

(87) PCT Pub. No.: WO2005/025932
PCT Pub. Date: Mar. 24, 2005

(65) Prior Publication Data
US 2006/0215416 A1    Sep. 28, 2006

Related U.S. Application Data

(60) Provisional application No. 60/501,069, filed on Sep. 8, 2003.

(51) Int. Cl.
*F21S 8/10* (2006.01)

(52) U.S. Cl. ............ 362/545; 362/508; 362/546; 362/547

(58) Field of Classification Search ............ 362/294, 362/800, 508, 516, 520, 523, 526, 528, 545–549
See application file for complete search history.

(56) References Cited

U.S. PATENT DOCUMENTS

| 5,136,483 A | 8/1992 | Schoniger et al. |
| 7,114,837 B2 * | 10/2006 | Yagi et al. ............ 362/523 |
| 2004/0202007 A1 | 10/2004 | Yagi et al. |

* cited by examiner

*Primary Examiner*—Stephen F Husar

(57) ABSTRACT

An LED headlamp assembly for a vehicle. The headlamp assembly includes a plurality of LED units mounted to a common carrier, where the LED units include one or more LEDs and generate white light. The headlamp assembly further includes a headlamp housing that is mounted to the vehicle by a mounting frame. The carrier is sealed to the housing by a flexible bellows. An outer lens is mounted to the housing so that the LED units are positioned within a sealed compartment. A backside of the carrier outside of the sealed compartment includes fins or other heat sinking devices to remove heat generated by the LED units. The frame allows convective air to flow around the heat sink to remove heat from the LED units. A series of actuators and/or pivots are mounted to the frame and to the carrier so that the carrier can be moved on at least one axis to adjust the direction of the LED headlamp assembly.

24 Claims, 3 Drawing Sheets

APPARATUS AND METHOD FOR MOUNTING AND ADJUSTING LED HEADLAMPS

CROSS-REFERENCE TO RELATED APPLICATIONS

This application is a National Stage of International Application No. PCT/US2004/028846, filed Sep. 7, 2004. This application claims the benefit of U.S. Provisional Application No. 60/501,069, filed Sep. 8, 2003. The disclosures of the above applications are incorporated herein by reference.

BACKGROUND OF THE INVENTION

1. Field of the Invention

This invention relates generally to an LED headlamp assembly for a vehicle and, more particularly, to an LED headlamp assembly for a vehicle that includes a plurality of LED units mounted to a common carrier and a mounting frame that is positioned behind the carrier for mounting the headlamp to the vehicle, where the mounting frame supports actuators and pivots that position and direct the carrier in such a manner that the mounting frame, actuators and pivots do not interfere with the heat sinking of the LED units.

2. Discussion of the Related Art

Vehicle styling and appearance provides significant and important advantages for attracting customers. One recognized area that is known to enhance vehicle attraction is the appearance and design of the various vehicle lights, sometimes referred to as the vehicle's jewels, including, but not limited to, headlights, tail lights, turn signals, back-up lights, center high mounted stop lamps (CHMSLs), running lights, fog lamps, side markers, etc. In fact, modern vehicle designs pay close attention to the styling and design of the vehicle lights.

Current vehicle lights employ various types of light sources suitable for different designs and conditions. For example, vehicle lighting designs have employed incandescent lamps, neon tubes, halogen lamps, xenon lamps, etc. Some modern vehicle light designs have employed light emitting diodes (LEDs) that are able to provide various colors in an inexpensive and compact arrangement. LEDs typically do not suffer from burnout, and have good drive characteristics, high luminance, high efficiency, high vibration resistance and durability. to endure repetitive on/off operations. Therefore, LEDs have been attractive for vehicle lighting.

LEDs emit monochromatic light at wavelengths depending on the doping characteristics of the LED semiconductor material. Traditionally, the most efficient LEDs have emitted red light, green light or blue light. It has heretofore not been possible to provide an LED semiconductor material that emits white light. However, various LED designs are available that convert colored light to white light. One design employs a combination of red, green and blue LEDs arranged close together. The light from the LEDs is combined and diffused to provide the white light. However, these types of LED designs have typically been limited because of variances in tone, luminance and drive power of the different LEDs.

Another white light LED design employs a colored light LED and a fluorescent material that absorbs the colored light and emits white light. U.S. Pat. No. 6,069,440, issued May 30, 2000 to Shimizu et al., discloses a white light LED including a layer of phosphor deposited over a blue light LED. The phosphor includes a fluorescent that absorbs the blue light and emits white light. In one particular design, the LED material is InGaN and the phosphor layer includes an yttrium-aluminum-garnet fluorescent material.

There is a push in the automotive industry to develop white light LEDs so that LEDs can be used in vehicle headlamps. Important design concerns for vehicle headlamps come into play when using the existing technology for generating white light from LED semiconductors, such as employing blue LEDs in combination with a phosphor layer. Particularly, intensity and directional considerations are important for the tightly regulated headlamp requirements. Further, providing a compact, efficient, low cost and aesthetically pleasing LED package is necessary.

Known LED headlamps typically include a plurality of LED units, each including one or more LEDs, mounted to a common carrier. The LED units generate considerable heat. This heat needs to be sinked away or removed from the unit so that the life and performance of the LED unit is not significantly degraded. To provide the heat sinking, the back of the carrier sometimes includes a suitable heat sink, such as spaced apart fins or pins, that draws heat away from the carrier generated by the LED units. Other, non-passive heat sinking techniques are also know to draw heat away from LED units of this type.

Further, the LED units need to be sealed from the environment so that moisture does not come in contact with the LED units and affect their operation. Also, it is necessary that actuators and pivots be provided to position the headlamp to satisfy its beam directional requirements. It has been suggested in the art that a flexible bellows could be coupled to the carrier and a headlamp housing so that the entire carrier including the LED units can be moved relative to the housing by actuators and pivots for directional purposes without affecting the compartment seal integrity. These designs typically require that the actuators and pivots be mounted to the edge of the carrier so as to not interfere with the heat removal capability of the heat sink.

The opening that vehicle manufacturers allow for headlamps is usually limited and tightly controlled. It is sometimes necessary to use as many LED units in an LED headlamp as possible to provide the required beam intensity. Because the actuators and pivots that adjust the position of the carrier are positioned at the edges of the carrier, this space is generally not available to be used for LED units, thus limiting the intensity for a particular sized headlamp opening. It would be desirable to move the actuators and pivots to a different location so that the entire opening is available to be filled with LED units.

SUMMARY OF THE INVENTION

In accordance with the teachings of the present invention, an LED headlamp assembly for a vehicle is disclosed. The headlamp assembly includes a plurality of LED units mounted to a common carrier, where the LED units include one or more LEDs and generate white light. The headlamp assembly further includes a headlamp housing that is mounted to the vehicle by a mounting frame. The carrier is sealed to the housing by a flexible bellows. An outer lens is mounted to the housing so that the LED units are positioned within a sealed compartment. A backside of the carrier outside of the sealed compartment includes fins or other heat sinking devices to remove heat generated by the LED units. The frame allows convective air to flow around the heat sink to remove heat from the LED units. A series of actuators and/or pivots are mounted to the frame and are coupled to the carrier so that the carrier can be moved on at least one axis to adjust the direction of the LED headlamp assembly.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to an LED headlamp for a vehicle is merely exemplary in nature, and is in no way intended to limit the invention or its applications or uses.

Figure 1:
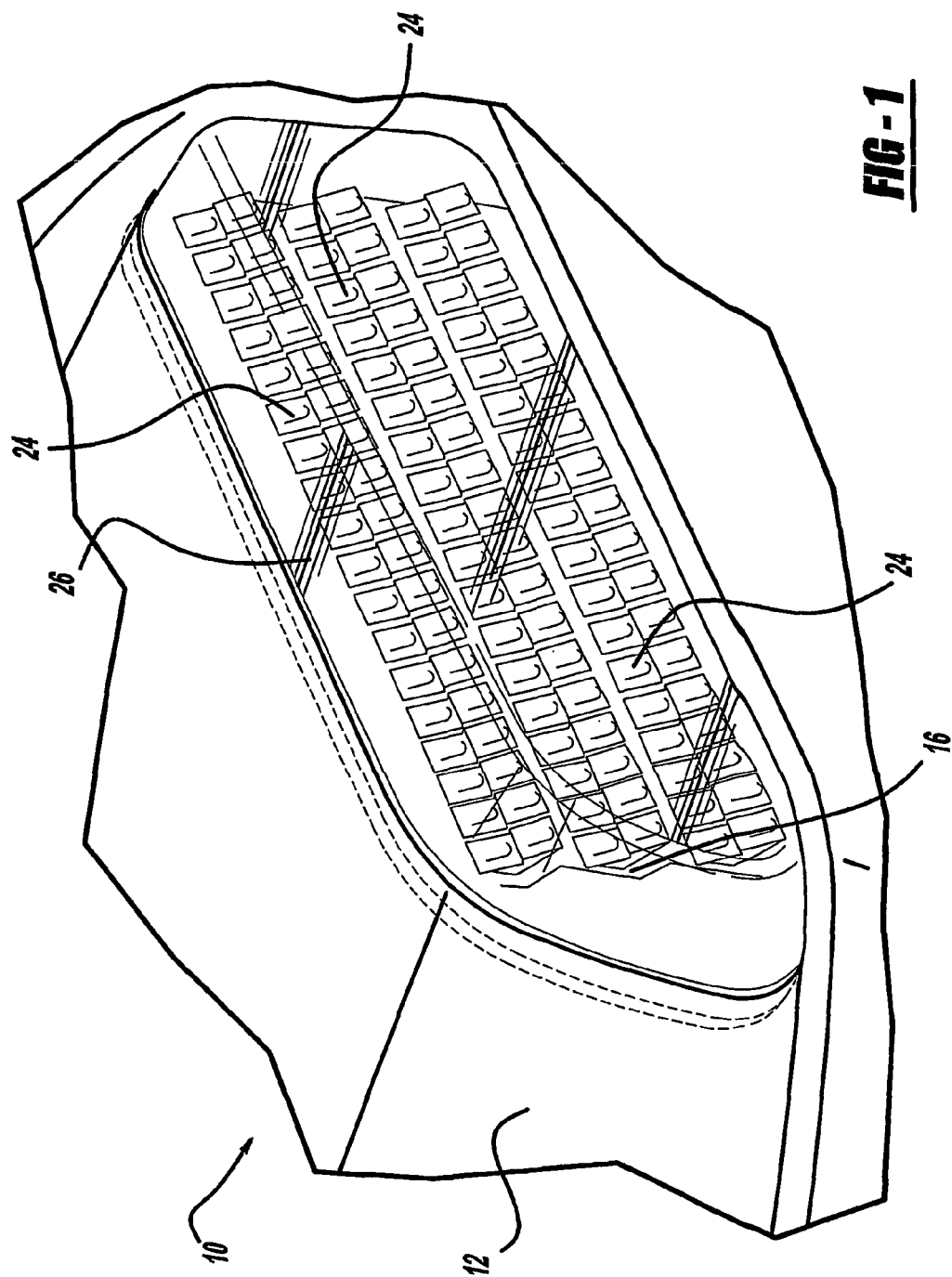
FIG. 1 is a front perspective view of a vehicle LED headlamp positioned within an opening of a vehicle body panel.
Figure 2:
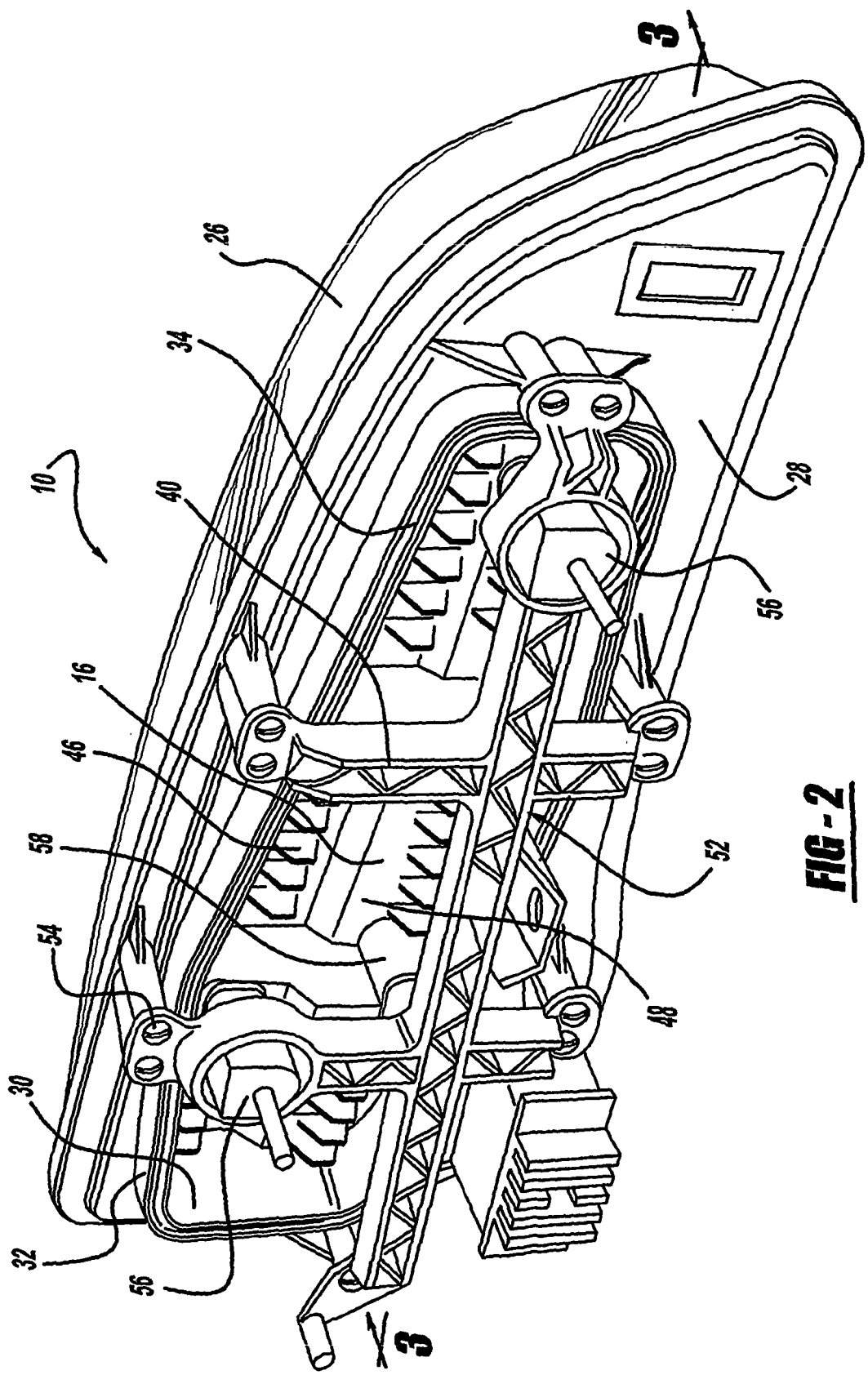
FIG. 2 is a back perspective view of the vehicle headlamp shown in FIG. 1.
Figure 3:
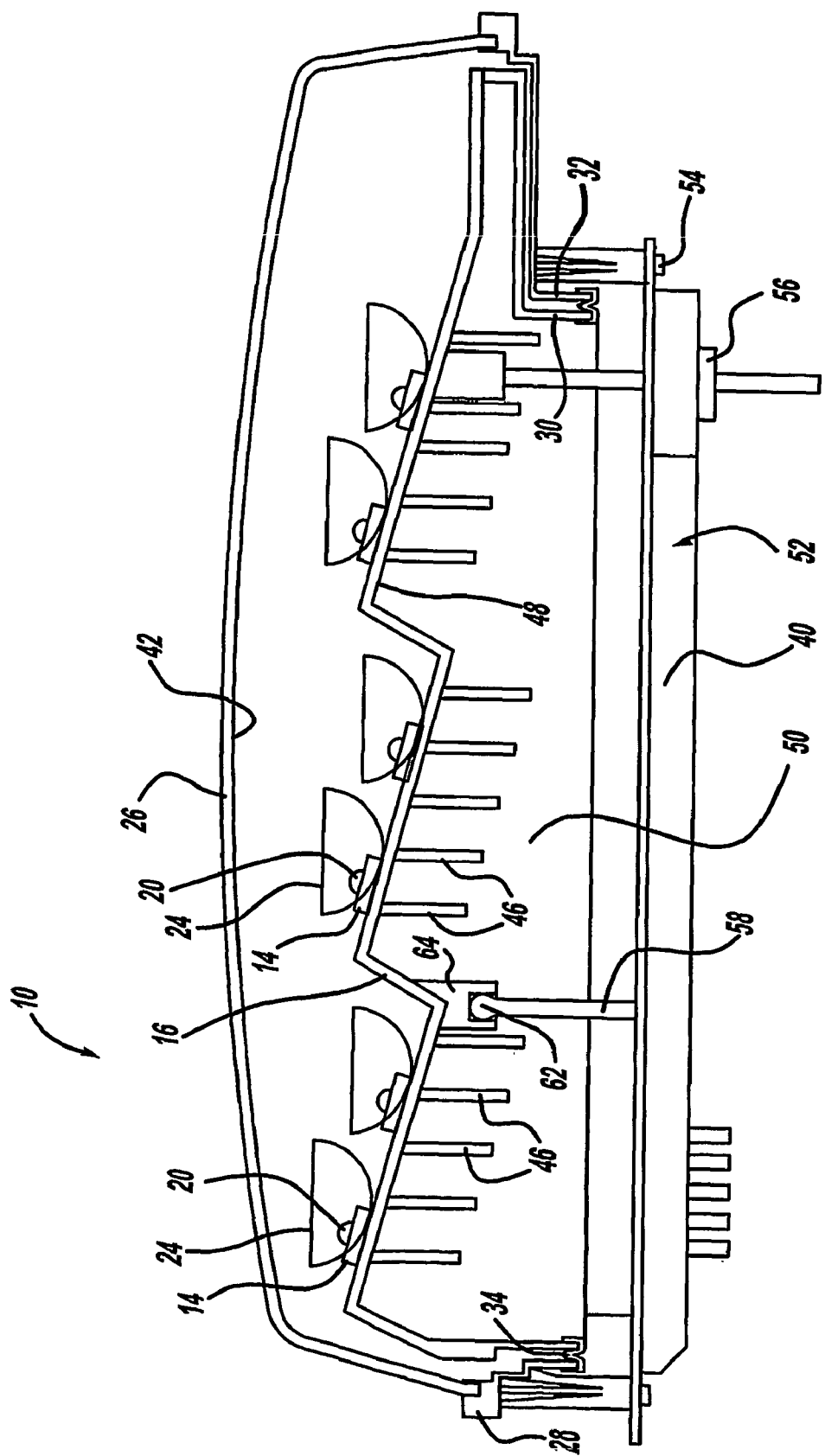
FIG. 3 is a cross-sectional view of the vehicle headlamp shown in FIG. 1.

FIG. 1 is a front perspective view of a vehicle headlamp assembly 10 mounted within an opening of a vehicle body panel 12. FIG. 2 is a back perspective view and FIG. 3 is a cross-sectional view of the headlamp assembly 10 removed from the vehicle. The headlamp assembly 10 includes a plurality of LED units 14 mounted to a common carrier 16. The carrier 16 can be made of any suitable heat conductive material, such as aluminum. Each LED unit 14 includes one or more LEDs. Light from the LEDs is focused into a beam by a primary optic 20. Each LED unit 14 includes a secondary optic 24 that focuses the light beam generated by the LED unit 14 in a particular direction. The combination of the primary optic 20 and the secondary optic 24 are shown by way of a non-limiting example. Other optical systems including other optical devices, such as reflectors, can also be employed within the scope of the present invention.

The headlamp assembly 10 includes any suitable number of LED units 14 that satisfy the beam intensity requirements for a particular application. LED units that produce white light for vehicle headlight purposes are known in the art. In one example, the LED produces blue light, and a phosphor material converts the blue light to white light, in a manner that is well known in the art. In another example, each LED unit includes an array of red, green and blue LEDs that combine to produce white light. Other suitable techniques and methods are also known in the art for generating white LED light that also may be applicable for the vehicle headlamp assembly 10.

The headlamp assembly 10 includes a headlamp housing 28 that has a particular shape suitable for the particular vehicle. In one embodiment, the housing 28 is a single piece plastic member that has been molded to the desired shape. A clear outer lens 26 is mounted to the housing 28, and allows the light generated by the LED units 14 to propagate through. The outer lens 26 can be made of a suitable optical plastic that is tough enough and scratch resistant enough for a vehicle headlamp. The outer lens 26 can be attached to the housing 28 by any suitable technique, such as by gluing.

The carrier 16 includes a circumferential flange 30 and the housing 28 includes a circumferential flange 32. A flexible bellows 34 is attached to the flange 30 of the carrier 16 and to the flange 32 of the housing 28, as shown. Because the bellows 34 is flexible, it allows the carrier 16 on which the several LED units 14 are mounted to move independent of the housing 28. The bellows 34 can be made of any suitable flexible material, such as a synthetic rubber. The bellows 34 can be attached to the flanges 30 and 32 by clip devices through a press-fit mechanical friction engagement. The clip devices can be made of any suitable material, such as a rigid plastic. The clips devices can be co-molded with the bellows 34, or be attached to the bellows 34 after it has been molded. In alternate designs, the clip devices can be replaced with other attachment devices, sealants, etc. The carrier 16, the housing 28, the bellows 34 and the outer lens 26 define a sealed compartment 42 so that the LED units 14 are not exposed to the environment.

The carrier 16 includes a series of heat sink fins 46 mounted to a surface 48 of the carrier 16 opposite to the LED units 14, as shown. The fins 46 are exposed to an opening 50 behind the carrier 16 so that air flows around the fins 46 to remove heat therefrom. As will be appreciated by those skilled in the art, the fins 46 provide one heat sinking option for the carrier 16. Other types of suitable heat sinks can also be employed, such as thermoelectric coolers, heat pipes, etc.

According to the invention, the headlamp assembly 10 includes a mounting frame 52, having cross-members 40, mounted to the housing 28 by a series of bolts 54 or the like. In an alternate embodiment, the mounting frame is co-molded with the housing 28. The frame 52 also mounts the headlamp assembly 10 to the vehicle. In one embodiment, the mounting frame 52 is a plastic molded member, however, this is by way of a non-limiting example. Two actuators 56 are mounted to the mounting frame 52 and are coupled to the carrier 16. Additionally, a pivot rod 58 is mounted to the frame 52 and is coupled to the carrier 16. The pivot rod 58 includes a ball 62 that is positioned within a socket 64 on the carrier 16. By actuating the actuators 56, the carrier 16 moves on two axes. In an alternate embodiment, the headlamp assembly 10 could include one actuators and two pivot rods to move the carrier in only one axis.

Because the frame 52 does not take up much space relative to the opening 50, it does not significantly interfere with the airflow around the heat sink fins 46. Further, because the actuators 56 and the pivot rod 58 are positioned behind the carrier 16, the carrier 16 can be made larger than is typically known in the art so that more LED units 14 can be mounted thereto to provide greater beam intensity. Also, the headlamp design can be smaller.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. An LED headlamp assembly comprising:
   a lamp housing;
   a carrier including a front side and a back side;
   a heat sink thermally coupled to the back side of the carrier;
   a plurality of LED units mounted to the front side of the carrier;
   a flexible bellows attached to the carrier and the housing to allow the carrier to move independent of the housing;
   a frame structure mounted to the housing adjacent to the back side of the carrier; and at least one actuator and pivot rod mounted to the frame structure and coupled to the carrier, said actuator and pivot rod being operable to adjust the position of the carrier on the bellows.

2. The headlamp assembly according to claim 1 wherein the at least one actuator and pivot rod is two actuators and one pivot rod, said actuators and pivot rod moving the carrier on two axes.

3. The headlamp assembly according to claim 1 wherein the at least one actuator and pivot rod is one actuator and two pivot rods, said actuator and pivot rods moving the carrier on one axis.

4. The headlamp assembly according to claim 1 wherein the frame structure is a molded member.

5. The headlamp assembly according to claim 1 wherein the lamp housing is a single piece plastic molded member.

6. The headlamp assembly according to claim 1 wherein the heat sink includes a plurality of fins.

7. The headlamp assembly according to claim 1 wherein the bellows is attached to a flange on the carrier by a clip device and a flange on the housing by a clip device.

8. The headlamp assembly according to claim 7 wherein the bellows and the clip devices are co-molded together.

9. The headlamp assembly according to claim 1 further comprising an outer lens, said outer lens being mounted to the housing and defining a sealed enclosure in which the LED units are mounted.

10. The headlamp assembly according to claim 1 wherein the frame structure includes a series of cross-members.

11. The headlamp assembly according to claim 1 wherein the housing is mounted to the frame structure by bolts.

12. An LED headlamp assembly comprising:
a lamp housing;
a carrier including a front side and a back side;
a heat sink thermally coupled to the back side of the carrier, said heat sink including a plurality of fins;
a plurality of LED units mounted to the front side of the carrier;
a flexible bellows attached to the carrier and the housing to allow the carrier to move independent of the housing, said bellows being attached to a flange on the carrier by a clip device and a flange on the housing by a clip device;
a frame structure mounted to the housing adjacent to the back side of the carrier, said frame structure including a series of cross-members;
an outer lens mounted to the housing and defining a sealed enclosure in which the LED units are mounted; and
at least one actuator and pivot rod mounted to the frame structure and coupled to the carrier, said actuator and pivot rod being operable to adjust the position of the carrier on the bellows.

13. The headlamp assembly according to claim 12 wherein the at least one actuator and pivot rod is two actuators and one pivot rod, said actuators and pivot rod moving the carrier on two axes.

14. The headlamp assembly according to claim 12 wherein the at least one actuator and pivot rod is one actuator and two pivot rods, said actuator and pivot rods moving the carrier on one axis.

15. The headlamp assembly according to claim 12 wherein the frame structure is a molded member.

16. The headlamp assembly according to claim 12 wherein the lamp housing is a single piece plastic molded member.

17. The headlamp assembly according to claim 12 wherein the bellows and the clip devices are co-molded together.

18. The headlamp assembly according to claim 12 wherein the housing is mounted to the frame structure by bolts.

19. A method for providing an LED headlamp assembly, said method comprising:
providing a lamp housing;
providing a carrier including a front side and a back side;
thermally coupling a heat sink to the back side of the carrier;
mounting a plurality of LED units to the front side of the carrier;
attaching a flexible bellows to the carrier and the housing to allow the carrier to move independent of the housing;
mounting a frame structure to the housing adjacent to the back side of the carrier; and
coupling at least one actuator and pivot rod to the frame structure and the carrier for adjusting the position of the carrier on the bellows.

20. The method according to claim 19 wherein coupling the at least one actuator and pivot rod includes coupling two actuators and one pivot rod, said actuators and pivot rod moving the carrier on two axes.

21. The method according to claim 19 wherein coupling the at least one actuator and pivot rod includes coupling one actuators and two pivot rods, said actuator and pivot rods moving the carrier on one axis.

22. The method according to claim 19 wherein thermally coupling a heat sink includes thermally coupling a heat sink that includes a plurality of fins.

23. The method according to claim 19 wherein attaching a flexible bellows to the carrier and the housing includes attaching the bellows to a flange on the carrier by a clip device and a flange on the housing by a clip device.

24. The method according to claim 19 further comprising mounting an outer lens to the housing.

* * * * *